United States Patent [19]
Aldecoa et al.

[11] Patent Number: 4,996,128
[45] Date of Patent: Feb. 26, 1991

[54] RECHARGEABLE BATTERY

[75] Inventors: Julio A. Aldecoa, Santa Cruz County; Lawrence F. Miller, Santa Clara County, both of Calif.

[73] Assignee: Nova Manufacturing, Inc., Scotts Valley, Calif.

[21] Appl. No.: 492,995

[22] Filed: Mar. 12, 1990

[51] Int. Cl.⁵ ............................................. H01M 2/00
[52] U.S. Cl. .................................... 429/153; 429/162; 429/163; 429/178; 429/210; 429/122
[58] Field of Search ............... 429/149, 153, 162, 163, 429/121, 122, 178, 210, 225, 176

[56] References Cited

U.S. PATENT DOCUMENTS

| | | | |
|---|---|---|---|
| 4,582,767 | 4/1986 | Morioka et al. | 429/121 |
| 4,619,873 | 10/1986 | Jshikura et al. | 429/121 X |
| 4,659,636 | 4/1987 | Suzuki et al. | 429/54 |

*Primary Examiner*—Anthony Skapars
*Attorney, Agent, or Firm*—Flehr, Hohbach, Test, Albritton & Herbert

[57] ABSTRACT

A rechargeable battery is provided having positive and negative plates formed of flexible substantially solid sheets. The plates are each pasted with an active material and separated by a light weight absorbent separator. A light weight casing provides structural support for the plates and encases the battery's components. The battery is preferably a recombinant lead acid battery with its plates being formed of lead foil sheets. The casing is preferably reinforced to maintain a constant spacing between the plates by a plurality of support pins extending between upper and lower casing members through the plate sheets. Plates may be stacked one above another to provide a plurality of cells. In separate aspects of the invention, a battery may be formed having a polar plate that has positive and negative surfaces on its opposite sides. In another separate aspect of the invention a novel terminal arrangement is provided.

19 Claims, 5 Drawing Sheets

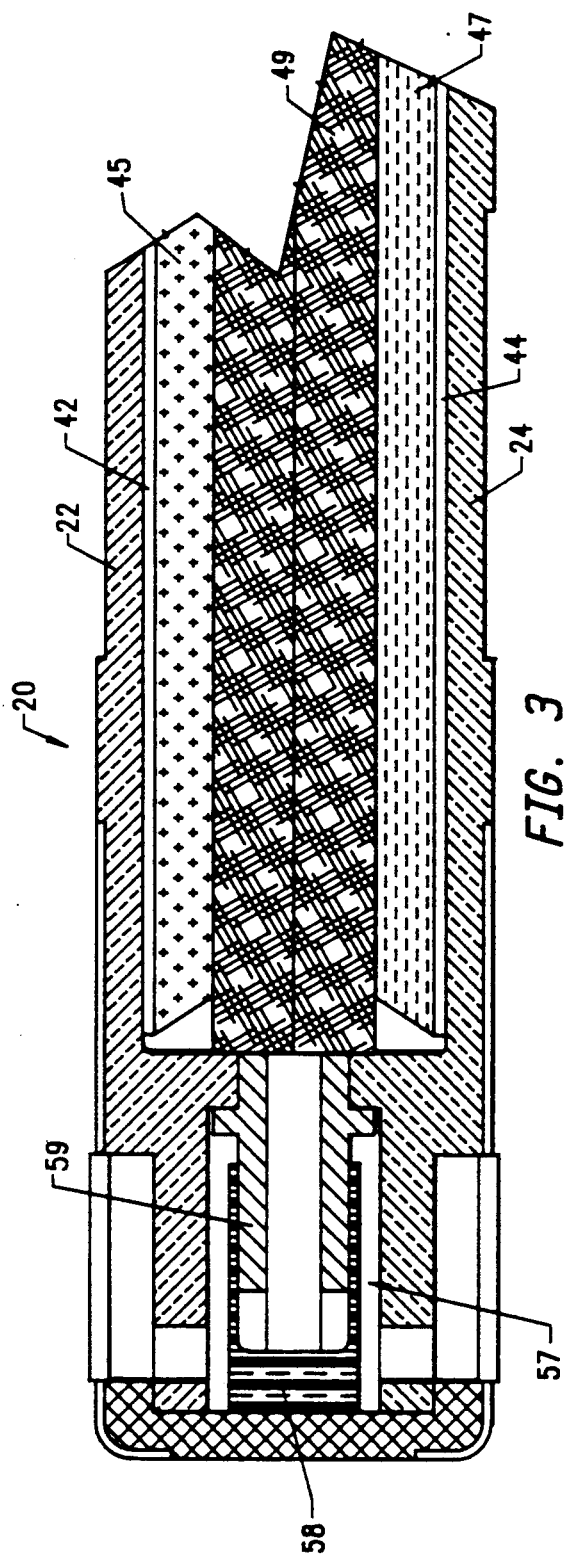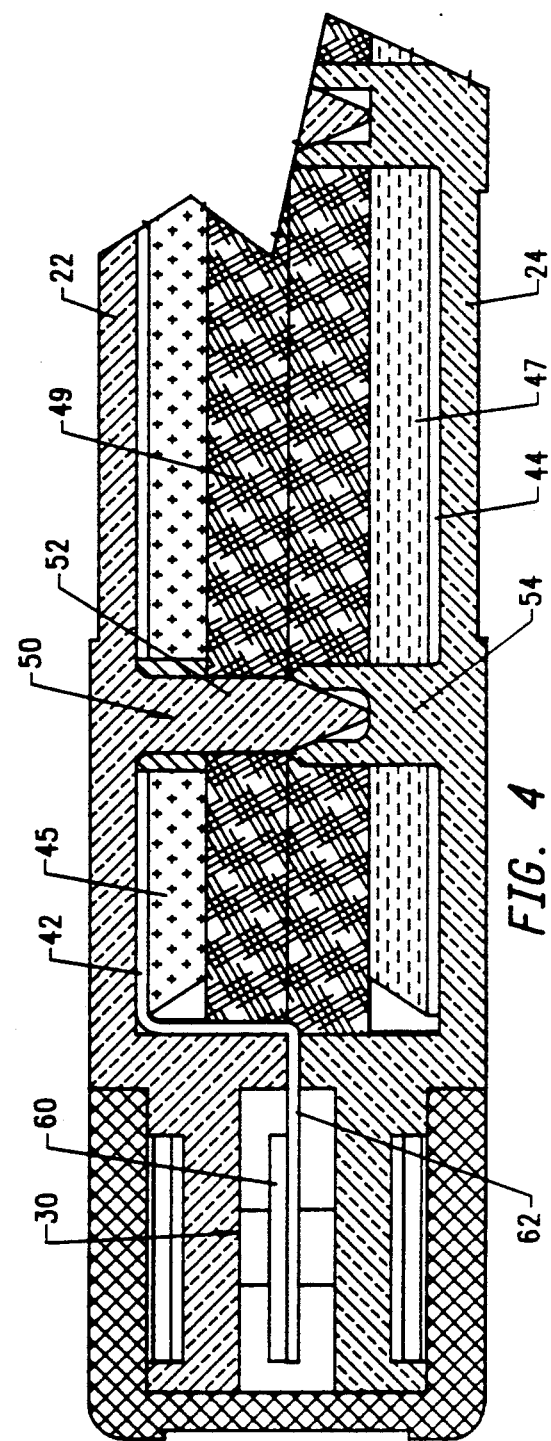

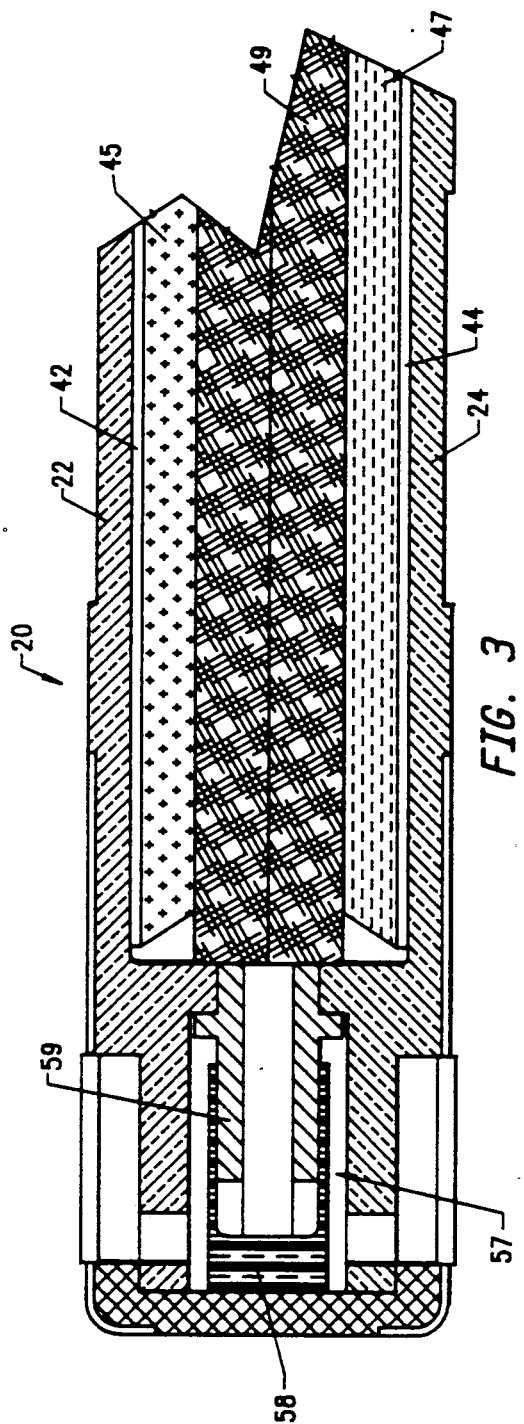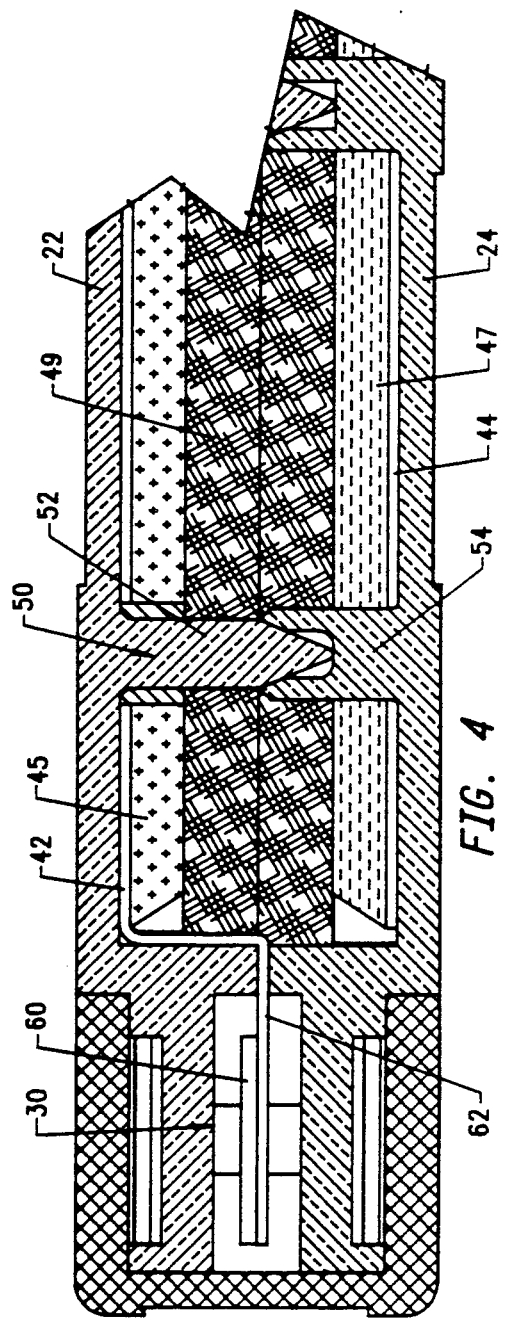

RECHARGEABLE BATTERY

Portions of the subject matter of this application were discussed in United States Disclosure Document 222543 date-stamped Mar. 20, 1989 in the U.S. Patent Office, which is incorporated herein by reference.

The present invention relates generally to rechargeable batteries. More particularly, an improved approach to the design of batteries and especially sealed lead acid batteries is described.

BACKGROUND OF THE INVENTION

With the increasing popularity of portable electronic appliances, there have been extensive efforts to reduce the size and weight of their various components. In many circumstances, one of the principle limitations to such size reductions is the energy storage device. Accordingly, there have been ongoing efforts to develop energy storage devices that are lighter in weight, smaller in size and capable of storing the maximum electrical charge per unit weight and/or size. In order to remain economical during extended uses, it is important that the batteries be rechargeable.

In recent years there have been substantial improvements in rechargeable battery technology; however, existing battery designs remain quite heavy in comparison with other electrical components. There are numerous batteries on the market, with the different designs using a wide variety of chemistries. The two most popular types of batteries that are used to power portable electronic devices are nickel cadmium (NICAD) batteries and sealed lead acid batteries.

The most common and probably the best known battery construction is lead acid. Substantially all the existing automotive battery designs are lead acid based. One advantage of lead acid batteries is that they have very repeatable power delivery characteristics and may be recharged and overcharged repeatedly with minimal damage to the cells. Additionally, the power curve is consistent enough that the charge remaining in a cell at any given time can be relatively accurately predicted by merely measuring the cell's potential. Thus, a user can be easily warned well in advance of a loss of power. The major drawback of lead acid batteries is that they tend to be heavy; traditionally, large lead grids are used to form the battery's plates and the cells are flooded with an acid based electrolyte. Typically, the grids are structurally self supporting which increases their weight. Additionally, in order to ensure a reliable electrolytic seal between adjacent cells, in practice it is generally necessary to form a gas tight seal about each cell.

A significant improvement to the traditional lead acid battery design is the recombinant battery. The recombinant lead acid battery differs from its predecessors in that substantially all of the electrolyte is absorbed within the separator between adjacent plates and/or an active paste applied directly to the plates. Gases evolved during operation or charging are not normally vented into the atmosphere, but rather are induced to recombine within the battery. With such an arrangement, no free acid is available, which allows the battery to be sealed and maintenance free. The elimination of free acid also provides a safer battery design.

Several refinements have been made to recombinant lead acid batteries. For example, U.S. Pat. No. 3,862,861 describes a significantly improved lead acid battery design, which uses flexible, non-self-supporting grids within a recombinant lead acid battery design. Specifically, the flexible grids are fabricated from a very high purity lead and are separated only by a microporous fiberglass material that retains the electrolyte within the separator itself. Such an arrangement improves the energy storage per unit weight characteristics of lead acid batteries since the separator structure is significantly lightened.

U.S. Pat. Nos. 4,383,011, 4,525,438 and 4,659,636 all describe alternative recombinant lead acid battery designs. The '636 design stacks a plurality of flattened cells in order to produce a somewhat flattened battery unit. Unfortunately, even these relatively improved lead acid battery designs only match the energy density (watt-hours of energy stored per unit weight of battery) and the packaging density (watt-hours of energy stored per unit volume of battery) of NICAD cells.

An important technical requirement of lead acid batteries is that the spacing between plates must be maintained at a constant distance. As is well known in the art, if the plates of a lead acid battery are not sufficiently constrained, the plates will expand and the battery degrades relatively quickly. Accordingly, the casing must be sufficiently strong to prevent separation of the plates under the influence of the considerable forces that can act on the plates during a charge/discharge cycle.

Two areas of prior art recombinant batteries are particularly bulky and/or heavy. The first is the electrodes which are typically fabricated from lead grids and the second is the casing structure which is typically heavily reinforced. Prior art batteries, such as those described above, merely increase the thickness of the casing in order to prevent deformation of their casings and/or electrodes. However, such external support is disadvantageous since it is quite bulky. Therefore, there is a need for an improved light weight battery plate support structure.

Although nickel-cadmium batteries tend to have slightly better energy and packaging density characteristics than conventional lead acid batteries, they also have numerous drawbacks for powering portable electronic units. Among the most noticeable is that their power delivery curves vary a great deal depending upon their charging and recharging history. Thus, they are unsuitable for use in devices that must be recharged at varying intervals. Accordingly, there is a need for an improved battery design that has improved energy density and packaging density characteristics.

SUMMARY OF THE INVENTION

It is a primary objective of the present invention to provide an improved rechargeable battery construction that has relatively high energy and packaging densities.

Another object of the invention is to provide an internal casing reinforcement structure that is both strong and light in weight.

To achieve the foregoing and other objects and in accordance with the purpose of this invention, a rechargeable battery is provided having positive and negative plates formed of flexible substantially solid sheets. The plates are each pasted with an active material and separated by a light weight absorbent separator structure. A lightweight casing provides structural support for the plates and cooperates to encase the plates, active material and separator. The battery is preferably a recombinant lead acid battery with its plates being formed of lead foil sheets.

The casing is preferably reinforced to maintain a constant spacing between the plates by a plurality of support pins extending between upper and lower casing members through the plates. In a preferred embodiment, the pins are formed from complementary pin portions that extend inward from the opposing upper and lower casing members respectively. The pin portions may be formed integrally with the upper and lower casing members.

In an alternative embodiment of the battery, a plurality of stacked cells are formed bY stacking pasted planer plates one above another with separators in between the adjacent plates.

In an alternative aspect of the invention, a rechargeable polar lead acid battery is formed wherein a polar plate is positioned between the positive and negative plates. The polar plate is formed from a sheet of lead foil and has positive and negative surfaces. The resultant battery has multiple cells that are combined in series to form a higher potential battery.

In another separate aspect of the invention a novel terminal arrangement is provided that extends outward from one end of the battery casing. The terminal arrangement includes a pair of spring loaded vertically aligned contacts facing upward and downward respectively. The upward facing contact is adjacent the outer surface of the upper casing and the downward facing contact is adjacent the outer surface of the lower casing. The vertically aligned contacts are coupled to the battery's positive and negative plates respectively. A pair of horizontally aligned contacts are also provided which face towards opposite sides of the casing such that the horizontally aligned contact pair face substantially perpendicular to the vertically aligned contact pair.

BRIEF DESCRIPTION OF THE DRAWINGS

The novel features of this invention are set forth with particularity in the appended claims. The invention, together with further objects and advantages thereof, may best be understood by reference to the following description taken in conjunction with the accompanying drawings in which:

FIG. 3 is a diagrammatic cross sectional side view of the terminal end of the battery shown in FIG. 1 taken along line 3—3 of FIG. 9;

FIG. 4 is a diagrammatic cross sectional side view of the terminal end of the battery shown in FIG. 1 taken along line 4—4 of FIG. 9, which highlights the pin construction;

DETAILED DESCRIPTION OF THE DRAWINGS

Figure 1:
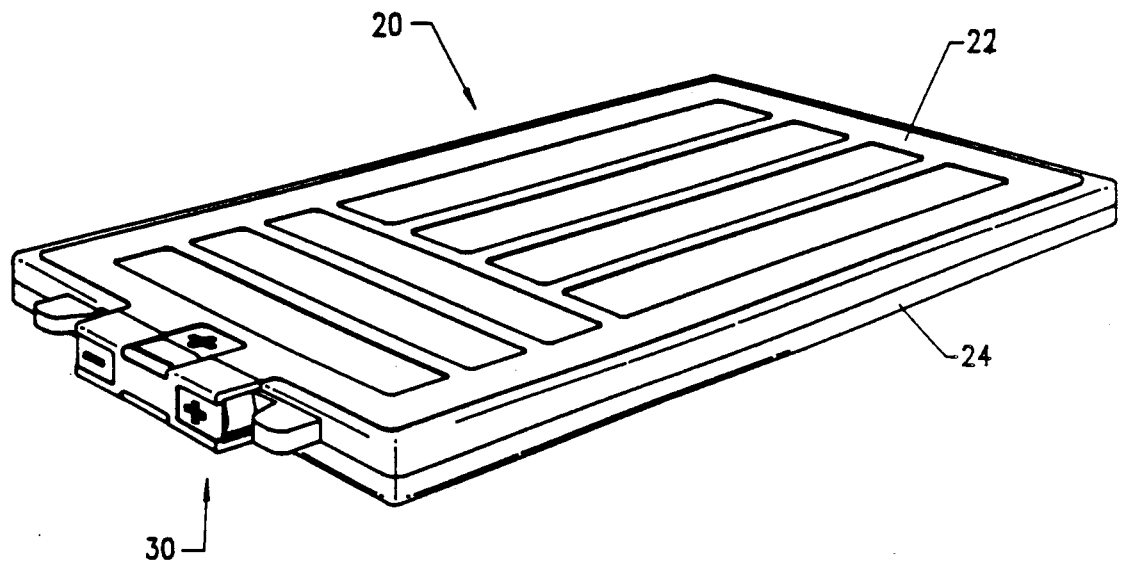
FIG. 1 is a perspective view of a battery fabricated in accordance herewith.

As illustrated in the drawings, the embodiment of the invention chosen for the purposes of illustration is a flat recombinant lead acid battery 20. Externally, as seen in FIG. 1, the battery has matching upper and lower casing members 22, 24 and a terminal arrangement 30. Referring next to FIGS. 3 and 4, the internal structure includes spaced apart positive and negative plates 42, 44 which are pasted with active materials 45 and 47 respectively. A separator 49 electrically isolates the plates. A multiplicity of pins 50 extend through the plates and separator to support the casing in order to maintain a constant spacing between the plates during operation and recharging. The pins 50 are formed from complementary pin portions 52 and 54 which are integrally formed with the upper and lower casing members 22, 24 respectively.

Figure 2:
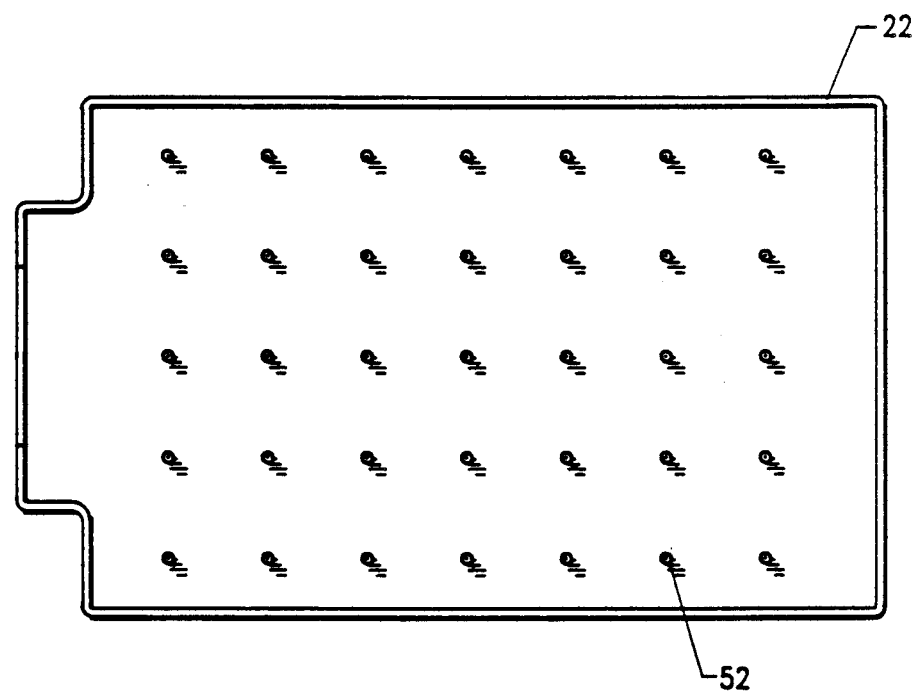
FIG. 2 is a bottom view of a representative upper casing member.

As discussed above, it is important to reinforce the casing to maintain a constant spacing between the plates. Since it is contemplated that the casing will be fabricated from a light weight and relatively inexpensive plastic material, the pins 50 are provided in order to provide internal structural support to the casing. It should be apparent that internal pins are a much lighter mechanism for supporting casing walls then merely thickening the walls to obtain the desired strength as has been extensively practiced in prior art battery designs. As seen in FIG. 2, the upper casing 22 has a matrix of male pin portions or posts 52 that extend inward from its interior surface. The lower casing 24 is similarly formed except that it has female pin portions or posts 54 designed to receive the upper casing post 52. The posts 52 and 54 are arranged such that they mate when the battery is assembled. Once the battery is fully assembled as described below, the posts are joined together. In the described embodiment, the casing members 22 and 24 are formed from plastic and the posts are ultrasonically welded together to form continuous pins. At the same time the upper and lower casing members are ultrasonicly welded together to seal the battery. The actual spacing of the pins 50 will vary a great deal depending upon the requirements of a particular battery. By way of example, one half inch centers have proven to be an effective spacing for typical planer battery designs.

The positive and negative plates 42 and 44 are formed from sheets of lead foil. The lead foil is not a structural member and can therefore be of a high purity and extremely thin. Since the foil is very thin, it is formed as a substantially continuous sheet of foil as opposed to a grid structure which is common in prior art lead acid battery plates. Although thinner sheets are generally preferable to thicker sheet, (since they are lighter in weight), in practice sheets of any thickness could be used. By way of example, suitable foil thicknesses of less than 0.01 inches may be used.

The plates 42 and 44 are each pasted with a suitable active material that includes a large amount of lead based compounds and/or free lead. Paste mixtures typical to conventional recombinant lead acid batteries may be used. A porous separator material that is capable of absorbing and retaining large amounts of free electrolyte is used as separator 49. A suitable separator material is a conventional high porosity microporous fiberglass. Commercially available microporous fiberglass having interior openings occupying over 90% of the materials volume work well. One of the important functions of the separator is to maintain a constant spacing between the batteries plates. The separator 49 is somewhat resilient. When the battery is assembled with the pasted plates, the separator is compressed somewhat. Therefore, it exerts a continuous force pushing against the plates to maintain the desired minimum plate spacing.

When assembling the described battery, a suitable matrix of holes 55 is punched into each plate 42, 44 in order to fit over the posts 52 and 54 respectively. Otherwise the foil forms a substantially continuous sheet as opposed to a conventional grid structure. It should be appreciated that the foil nature of the plates makes it extremely easy to punch the desired matrix of holes.

It is generally desireable to supply the battery with as much electrolyte as possible without flooding the battery. That is all of the electrolyte added should be retained within the separator 49 and the active materials 45, 47. Thus, when the battery is filled with electrolyte, care must be taken to insure that the correct amount of electrolyte is added. Although recombinant lead acid technology is used to fabricate the battery, at times overcharging or malfunctions of the battery may lead to the generation of significant amounts of free gases within the internal cavity of the battery. Accordingly, a conventional pressure relief device 57 is provided to release the gases in the event of a significant overpressurization. In the embodiment shown in FIG. 3, the pressure relief device is a conventional bunson valve having a rubber cap 58 journaled over one end of a plastic pipe 59. The opposite end of plastic pipe 59 opens into the interior of the battery casing.

The terminal arrangement 30 extends from the front end of the casing. As described in more detail below, the terminal arrangement has a pair of vertically aligned contacts 64, 74 and a pair of horizontally aligned contacts 65, 75 which are both arranged to electrically couple the battery to electronic devices.

Figure 5:
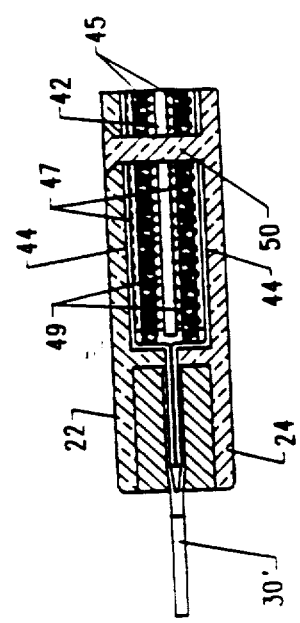
FIG. 5 is a diagrammatic cross sectional side view of an alternate embodiment of the present invention which uses a three plate configuration.

The described planar battery construction is particularly well suited to both internal and external stacking in order to provide a battery or battery pack having any desired voltage potential and/or capacity. Reference is next made to FIG. 5, which shows a three plate configuration having two negative plates in order to approximately double the battery's capacity when compared to the two plate configuration described above. In this embodiment, two pasted negative plates are secured to the upper and lower casing members 22 and 24 respectively. A pair of porous separators 49 are positioned adjacent the inner surfaces of the negative paste materials. A substantially continuous sheet of lead foil which is pasted on both sides with a positive active material 45 is disposed between the separators 49 to form a single positive collection plate having two active surfaces. The resultant battery is a single lead acid cell having a potential of slightly over two volts.

Figure 6:
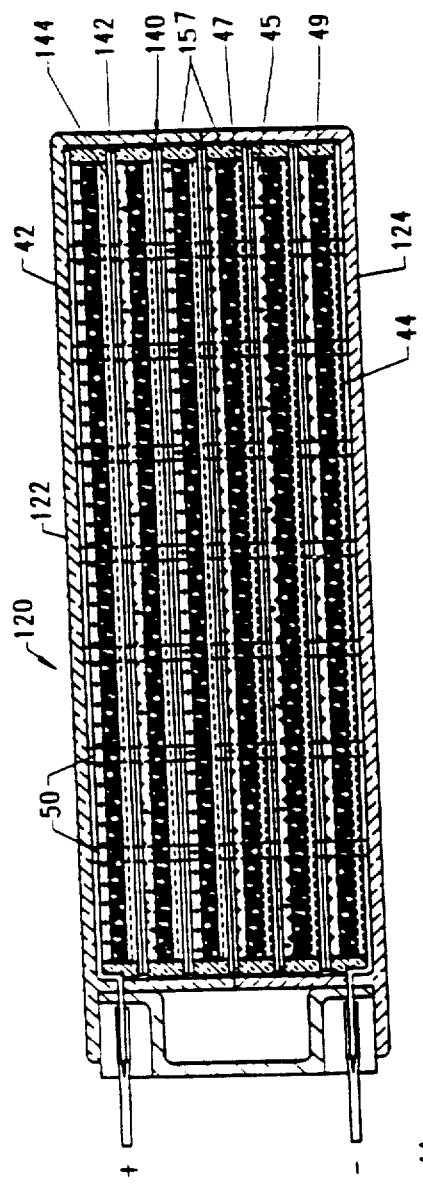
FIG. 6 is a diagrammatic cross sectional side view of a multicell battery in accordance herewith.

Referring next to FIG. 6, a multi-cell battery construction will be described. A six cell, 12 volt battery 120 is constructed having a positive plate 42 carried by upper casing member 122 and a negative plate 44 carried by lower casing member 124. As in the previous described embodiments, the plates are pasted with a conventional active material. Additional cells are formed by inserting dual plate structures 140 between the spaced apart positive and negative plates 42 and 44 with separators 49 being placed between adjacent dual plate structures 140 as well as between the outer dual plate structures and plates 42 and 44 respectively.

The dual plate structures 140 are formed by placing a pair of lead foils 142 and 144 back to back. One of the lead foils (foil 144) is pasted with a negative active material 47 while the other (foil 142) is pasted with a positive active material 45. The back to back foils are placed below the positive plate 42 with a separator 49 disposed between the positive plate 42 and the negative foil 144. Thus, the positive foil 142 faces towards the negative plate 44. At this point two cells have been formed. Additional cells are fabricated merely by stacking additional dual plate structures 140 below the first and inserting separators 49 between the additional dual plate structures as seen in FIG. 6. In that figure, six cells are formed by placing five dual plate structures 140 between the spaced apart positive and negative plates 42 and 44. Of course, separators 49 are positioned between adjacent dual plate structures in order to maintain the desired plate spacing. Similarly, separators 49 are positioned between the top dual plate structure and the positive plate 42, as well as between the bottom dual plate structure and the negative plate 44. As in the previously described embodiments, internal support pins 50 extend between the upper and lower casings in order to maintain the overall spacing between plates. Since the separators 49 act as spacers, the actual spacing between opposing foils remains constant as well.

Since the positive and negative foils 142 and 144 within each dual plate structure are maintained at the same potential, it is not necessary to isolate the plate foils, so long as the electrolyte within each cell does not leak between the opposite foils. Indeed it is important to have good contact between the back to back plates. As described with respect to the first described embodiment, the plates are held compressvely in place by the combined spring forces of the separators and the casing pins.

To prevent leakage of electrolyte between the adjacent cells, the plates may be cut such that they have slightly larger dimensions than the separator 49. Then isolation rings 157 having substantially the same thickness as the separators 49 may be inserted about the various separators such that they are sandwiched between the adjacent dual plate structures as well as between the outer dual plate structures and the positive and negative foils 142 and 144. The isolation rings 157 encircle the separators to maintain a good seal about the ends of the plate.

In practice, if the proper amount of electrolyte is used initially, virtually all of the electrolyte will remain absorbed within either the active paste materials 45, 47 or the microporous separator 49 via surface tension. Thus, the back to back plate foils 142 and 144 may be pressed together as shown in FIG. 6. Since virtually all of the electrolyte remains within the active material paste and the separator, there is very little migration of electrolyte between the back to back positive and negative pastes. Accordingly, it is not necessary to tightly seal the holes 155 through which support pins 50 pass.

Figure 7:
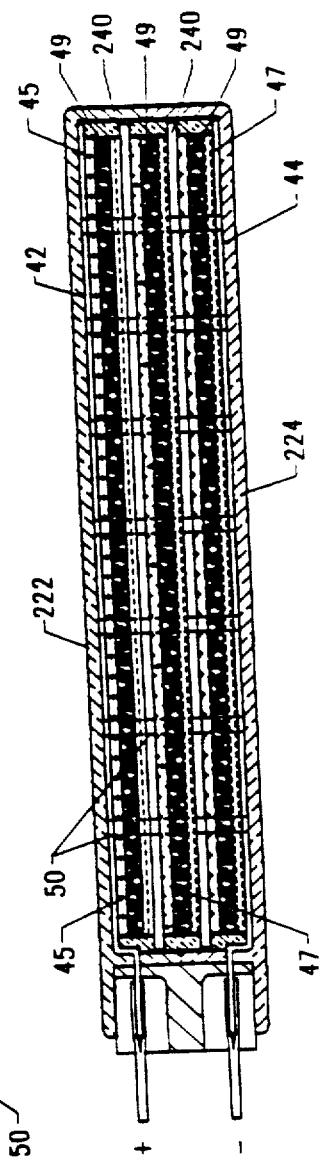
FIG. 7 is a diagrammatic cross sectional side view of a multicell polar battery embodiment of the present invention.

Referring next to FIG. 7, a polar battery having a single continuous foil acting as a positive plate for a first cell and a negative plate for an adjacent cell will be described. The polar battery 220 closely resembles the multicell battery described above with respect to FIG. 6. However, the polar battery 220 uses a polar plate 240 formed of a single lead foil sheet in place of the two lead foil sheets provided within the dual plate structure 140. One side of the polar plate 240 is pasted with a positive active material 45, while the opposite side is pasted with a negative active material 47. The use of a polar plate eliminates the need to electrically couple serially connected cells. In all other manners the polar battery may be formed in exactly the same way as the multicell battery previously described. Thus, the six volt battery shown in FIG. 7 has positive and negative pasted plates 42 and 44 which are placed against the upper and lower casing members 222 and 224 respectively. Two pasted polar plates 240 are stacked between the positive and negative plates with the negative sides of the polar plates facing the positive plate 42 and the positive sides of the polar plates facing the negative plate 44. The number of cells within the battery can be readily changed to provide any desired potential.

Figure 8:
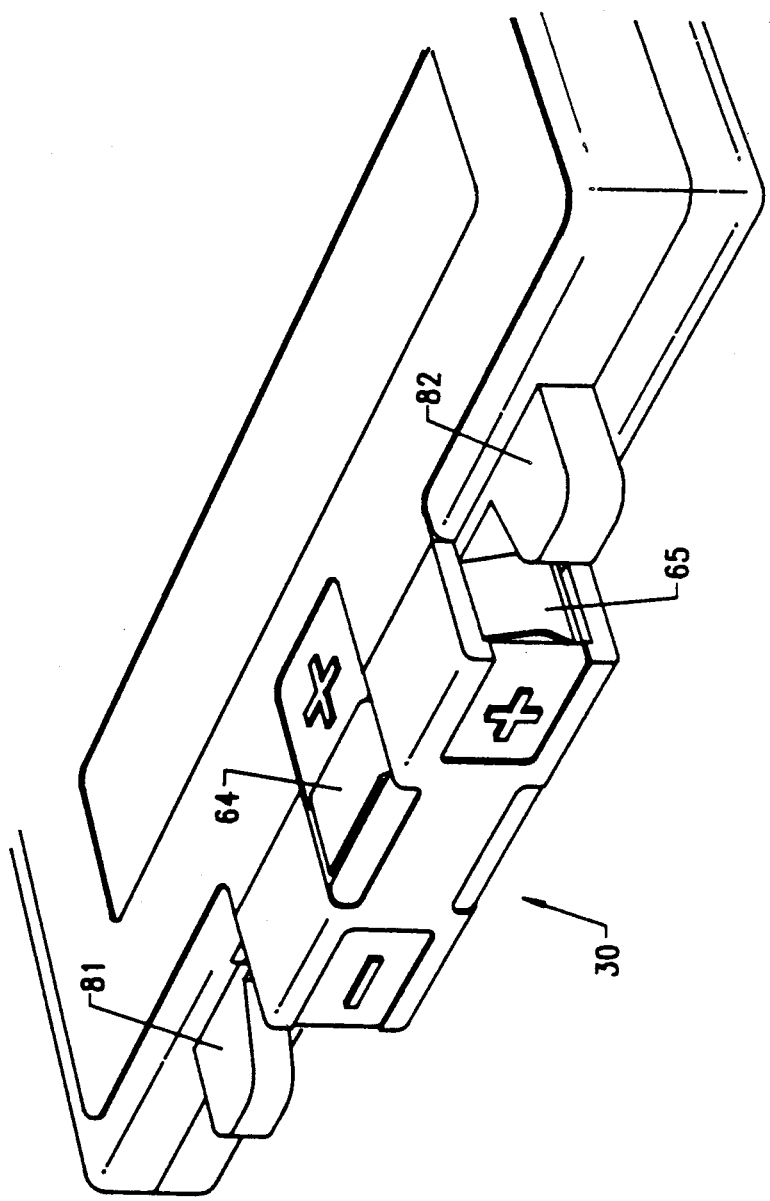
FIG. 8 is an enlarged perspective view of a suitable terminal structure.
Figure 9:
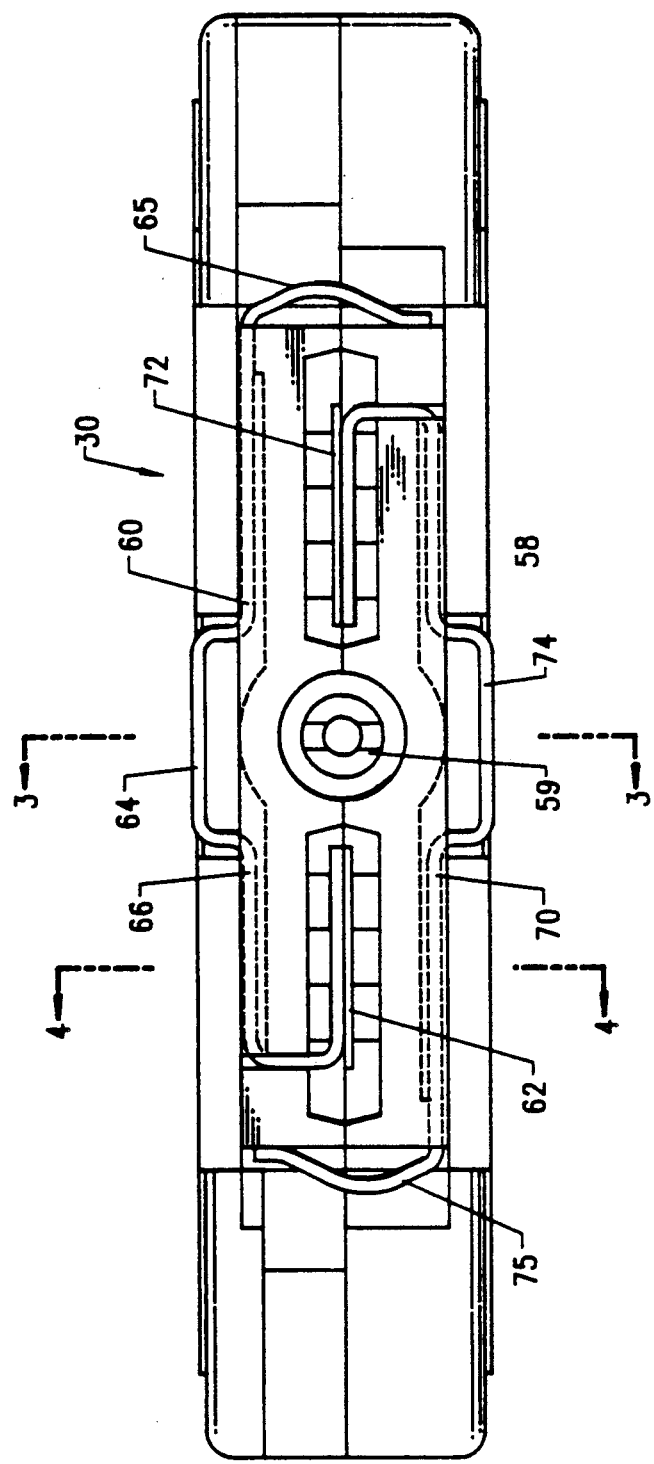
FIG. 9 is a cross sectional end view of the terminal structure shown in FIG. 8.

Referring next to FIGS. 8 and 9, a preferred battery terminal arrangement will be described. The terminal arrangement 30 has four contact points. Two are positive contact points and two are negative contact points. A positive contact member 60 is coupled to the positive electrode 42 by positive lead 62. The contact member 60 has two contact points 64 and 65 and is arranged to act as a spring with respect to both of the contact points. The contact member has a U-shaped portion 66 one leg of which is coupled to the positive lead 62. The other leg is extended to form the contact points 64 and 65. Contact point 64 is also U-shaped and extends substantially perpendicularly with respect to the U-shaped portion 66. Thus, the U-shaped portion 65 acts as a spring that urges contact point 64 outward. The contact member then extends beyond U-shaped contact point 64 in line with the second leg of the U-shaped portion 66. The contact point 65 depends from the end of the extension in a manner that is substantially perpendicular to the extension so as to provide a spring biasing for the second contact point 65.

The negative contact member 70 is formed in the same manner as the positive contact member and forms negative contact points 74 and 75 which are positioned opposite the positive contact points. Thus, contact points 64 and 74 are vertically aligned, while contact points 65 and 75 are negatively aligned as can be seen in FIGS. 8 and 9. The negative contact member 70 is coupled to the negative electrode 44 via negative lead 72. The positive and negative leads 62 and 72 may be formed integrally with the plates 42 and 44 respectively so as to be mere extensions of the foil plates. Thus, during fabrication of the plates, the appropriate plate/-lead structure may be punched from a lead foil sheet.

The described contact arrangement is particularly well suited for stacking batteries to form battery packs having a plurality of serially connected batteries. Specifically, the vertically aligned contact points 64 and 74 extend just slightly above the planer outer upper and lower surfaces of the battery. Since the contact points are spring loaded the contacts within the pack that are coupled to an adjacent battery contact are readily pressed inward such that they are substantially coplaner with the outer surface of the battery to form a good solid spring loaded connection between the serially stacked batteries. The horizontally aligned contacts, allow stacked batteries and/or battery packs to be recharged using a continuous bus having extended parallel contact surfaces. Like the vertically aligned contacts, the horizontally aligned contacts are spring loaded to provide solid electrical connections with the devices they are plugged into.

A pair of protective ears 81 and 82 are positioned on opposite sides of the horizontally aligned contacts 65 and 75 to protect those contacts from damage. The ear 82 positioned adjacent the positive contact 65 is a bit thicker than ear 81. Thus, electrical receptacles can be designed to cooperate with the ears 81 and 82 to prevent inadvertently reversing the polarity of a battery or a battery pack by plugging it into an electronic device or recharger the wrong way.

Although only a few embodiments of this invention have been described herein, it should be understood that the present invention may be embodied in many other specific forms without departing from the spirit or scope of the invention. Particularly, it should be appreciated that the internal support of the battery casing may be accomplished using many designs other than the described pin structure. The planer battery structure described is particularly well suited for stacking and has a high packaging density. However, it is contemplated that the advantages described herein may be applied to non-planer battery designs as well. Additionally, many of the advantages of the present invention are applicable to batteries that use chemistries other than lead acid. Therefore, the present examples and embodiments are to be considered as illustrative and not restrictive, and the invention is not to be limited to the details given herein, but may be modified within the scope of the appended claims.

What is claimed:

1. A rechargeable battery comprising:
   a first plate formed of a first sheet of substantially solid metallic foil;
   a second plate formed of a second sheet of substantially solid metallic foil;
   a first active paste material applied to said first plate;
   a second active paste material applied to second to said second plate, the second paste material being charged opposite the first paste material;
   a separator for isolating the first and second paste materials; and
   reinforcing means for maintaining a substantially constant spacing between said plates during operation and recharging of the battery; and a casing for enclosing said plates, separator and active materials, the casing providing support for said plates and wherein said reinforcing means includes a plurality of pins extending between opposite sides of said casing through said foil plates.

2. A rechargeable lead acid battery comprising:
   a positive plate formed of a first sheet of substantially solid lead foil;
   a negative plate formed of a second sheet of substantially solid lead foil;
   a first active paste material applied to the positive plate;
   a second active paste material applied to the negative plate, the second paste material being charged opposite the first active paste material;
   a absorbent separator for isolating the first and second paste materials, the separator being adapted for absorbing and retaining electrolyte therein;
   a battery casing having upper and lower casing members each having outer and interior surfaces, the casing members providing structural support for said plates and cooperating to encase said plates, active material and separator, the casing forming opposing sides and a first end; and
   means for maintaining a substantially constant spacing between said plates during operation and charging of the battery, the spacing means including a plurality of support pins extending between said upper and lower casing members through said plates to support the casing.

3. A battery as recited in claim 2 wherein said battery has a plurality of stacked cells and said pins extend through said stacked cells.

4. A battery as recited in claim 2 wherein each said support pin includes:
 a first pin portion extending inward from the interior surface of said upper casing member; and
 a complementary second pin portion that extends inward from the interior surface of the lower casing member to engage said first pin portion.

5. A battery as recited in claim 4 wherein said first pin portions are formed integrally with said upper casing member and said second pin portions are formed integrally with said lower casing member.

6. A battery as recited in claim 2 further comprising a terminal arrangement extending forward from the first end of the casing, the terminal arrangement including a first pair of vertically aligned contacts facing upward and downward respectively, the upward facing contact being adjacent the outer surface of the upper casing and the downward facing contact being adjacent the outer surface of the lower casing, said aligned contacts being coupled to said positive and negative plates respectively.

7. A battery as recited in claim 6 wherein said terminal arrangement further includes a second pair of horizontally aligned contacts facing towards opposite sides of the casing such that the second contact pair face substantially perpendicular to said first contact pair and said first casing end, the second contact pair being positioned on opposite sides of said first contact pair.

8. A battery as recited in claim 2 wherein said separator is a microporous fiberglass.

9. A packaging arrangement for a battery having non-self-supporting positive and negative plates, an active material and a electrolyte, the packaging arrangement comprising:
 a casing arranged to encase said plates, active material and electrolyte the casing each outer and interior surfaces, the casing providing structural support for said plates;
 a plurality of support pins extending from opposite sides of the casing through said plates to support the casing and to maintain substantially constant spacing between the plates during operation and charging of the battery.

10. A battery casing as recited in claim 9 wherein the casing includes opposing first and second casing members that cooperate to encase the plates, active material and electrolyte and wherein each said support pin includes:
 a first pin portion extending inward from the interior surface of said first casing member; and
 a complementary second pin portion that extends inward from the interior surface of the second casing member to engage said first pin portion.

11. A battery casing as recited in claim 10 wherein said first pin portions are formed integrally with said first casing member and said second pin portions are formed integrally with said second casing member.

12. A battery casing as recited in claim 10 wherein said battery is a recombinant lead acid battery and said plates are substantially solid sheets.

13. A battery casing as recited in claim 12 wherein said battery has a plurality of stacked cells and said pins extend through said stacked cells.

14. A battery casing as recited in claim 10 wherein said first and second casing members cooperate to form a flat casing having upper and lower surfaces, opposing sides and a first end, the battery casing further comprising a terminal arrangement extending from the first end of the casing, the terminal arrangement including a first pair of vertically aligned contacts facing upward and downward respectively; the upward facing contact being adjacent the outer surface of the upper casing and the downward facing contact being adjacent the outer surface of the lower casing, said aligned contacts being coupled to said positive and negative plates respectively.

15. A battery casing as recited in claim 14 wherein said terminal arrangement further includes a second pair of horizontally aligned contacts facing towards opposite sides of the casing such that the second contact pair face substantially perpendicular to said first contact pair and said first casing end, the second contact pair being positioned on opposite sides of said first contact pair.

16. A rechargeable polar lead acid battery comprising:
 a positive plate formed of a lead based material;
 a negative plate formed of a lead based material;
 a polar plate being positioned between said positive and negative plates, said polar plate being formed from a lead based sheet and having positive and negative surfaces;
 separator means for separating the various plates; and
 wherein the plates and said separator means are arranged to form a plurality of battery cells and a casing for encasing said plates and separator means; and internal support means extending between opposing walls of the casing for maintaining a substantially constant spacing between said plates during operation and charging of the battery, the support means including a plurality of support pins extending between the opposing walls through said plates to support the casing.

17. A battery as recited in claim 16, wherein:
 the negative plate and the negative surface of the polar plate are each pasted with a first active material; and
 the positive plate and the positive surface of the polar plate are each pasted with a second active material that is charged opposite the first active material.

18. A battery as recited in claim 17 wherein each of the plates is non-self-supporting sheet of lead foil.

19. A battery as recited in claim 17 further comprising a plurality of polar plates, the polar plates being stacked adjacent one another between the positive and negative plates and wherein said separator means also separates the various polar plates to form additional cells.

* * * * *

UNITED STATES PATENT AND TRADEMARK OFFICE
CERTIFICATE OF CORRECTION

PATENT NO. : 4,996,128

DATED : February 26, 1991

INVENTOR(S) : Julio A. Aldecoa, et al

It is certified that error appears in the above-identified patent and that said Letters Patent is hereby corrected as shown below:

The Drawing Sheet, consisting of Figs. 5, 6, and 7, should be added as shown on the attached page.

Signed and Sealed this

Seventh Day of September, 1993

Attest:

*Attesting Officer*

BRUCE LEHMAN

*Commissioner of Patents and Trademarks*